J. A. STOCKWELL,

Assignor, by mesne assignments, to AMERICAN SHOE TIP CO.

Toe Protector for Boots and Shoes.

No. 9,514. Reissued Dec. 21, 1880.

Witnesses.

Arthur Reynolds.

L. F. Connor

Inventor.

John A. Stockwell.

by Crosby & Gregory Attys.

N. PETERS, PHOTO-LITHOGRAPHER, WASHINGTON, D. C.

UNITED STATES PATENT OFFICE.

JOHN A. STOCKWELL, OF CHICAGO, ILLINOIS, ASSIGNOR, BY MESNE ASSIGNMENTS, TO AMERICAN SHOE TIP COMPANY, OF HARTFORD, CONNECTICUT.

TOE-PROTECTOR FOR BOOTS AND SHOES.

SPECIFICATION forming part of Reissued Letters Patent No. 9,514, dated December 21, 1880.

Original No. 147,579, dated February 17, 1874; Reissue No. 6,123, dated November 3, 1874; Reissue No. 6,927, dated February 15, 1876. Application for reissue filed July 6, 1880.

*To all whom it may concern:*

Be it known that I, JOHN A. STOCKWELL, formerly of Boston, county of Suffolk, State of Massachusetts, but now residing temporarily in Chicago, State of Illinois, have invented certain new and useful Improvements in Boots and Shoes; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

The nature of my invention relates to an improvement in guards for boots and shoes; and it consists in forming the guard from a single piece of leather or other suitable fibrous material, that will not only protect the upper, but at the same time form a tap-sole.

Figure 1:
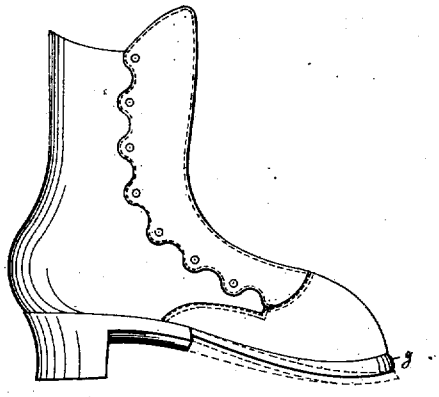
Figure 5:
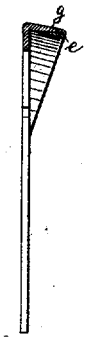
Figure 3:
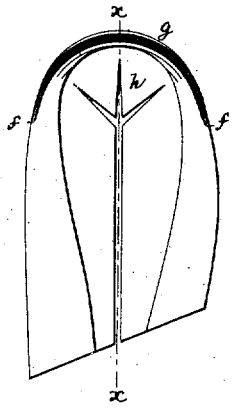
Figure 4:
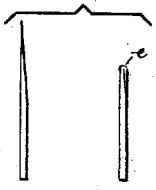
Figure 2:
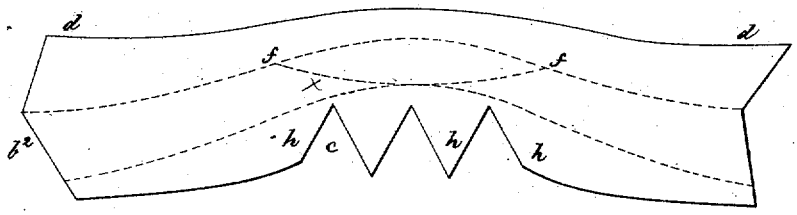

Figure 1 represents, in side elevation, a shoe provided with one of my improved tips, to protect the upper about the toe; Fig. 2, one of such tips straightened out after having been bent into shape to fit the toe of a shoe, the turned-over edge being also unfolded. Fig. 3 represents, in top view, the narrow strip from which the tip is made as bent into form to be applied to a shoe, the strip so employed being shown of sufficient length as, when bent, to form not only a guard about the toe, but also along the sides of the upper, and also a half-sole. Fig. 4 represents sections of the blank before and after folding its edge; Fig. 5, a section on line *x x*, Fig. 3.

The object of this invention is to form a tip from a strip of a fibrous nature, or similar suitable material, so that when wet the projecting edge of such tip will not fall away form, but always remain firmly and closely up against, the toe of the boot or shoe.

To carry out my invention in the manufacture of tips, I take a strip of leather or suitable material, $b^2$, such as described, it being of suitable length and width, and after it has been compressed to increase its solidity I cut at one edge of it notches *c* or a slot. The outer edge, *d*, of the strip is then turned inward upon itself, so as to form a folded edge, as at *e*, which then becomes of double thickness, such fold giving to all parts of the strip liable to be exposed to sight when on the shoe the finish of the grained surface of the leather.

The central portion of the upper edge of the strip, which is to constitute the guard *g* for the front of the toe, is made to project upward from the remaining portion of the strip by bending the strip into the form shown in Fig. 3. To do this and cause this edge to project upward from the base portion, *h*, of the strip, and also incline inward, as shown in Fig. 5, so as to form the central part, *g*, or guard for the front of the toe, such strip is applied to the toe of a last-shaped form or last, so that that portion of the edge of the strip between the points *f f* (such portion entering into the formation of the guard) bears on and is stretched closely about that portion of the form which corresponds with that part of an ordinary last about which the toe of the upper fits to form the toe of an ordinary shoe, the portion *f* lapping over the toe of said form more or less, according to the height desired for the guard. Then, while the edge *f* is so held stretched upon the form the parts of the strip which are to enter into the base portion of the tip, or that portion which is to extend under the front of the toe part or vamp of the shoe, are turned over upon the bottom of the last-form, and the ends of the strip at its notched or inner edge are bent or curved so as to approach each other or come substantially together, as in Fig. 3, in which shape the strip is set or caused to remain by pounding or crimping. In this way one edge of the strip between the points *f f*, held on the form while the strip was stretched, bent, and turned, as described, is made to project upward and backward from the base portion, as shown in Fig. 5.

It will be noticed that the bend in the tip between the guard or upright portion *g* and the portion *h*, which extends under the upper, does not run parallel with that edge of the strip which forms the top of the guard, but is so curved with reference to such edge (see dotted line *x*) as to afford a guard of the proper height at the toe of the boot or shoe, the guard from the front of the tip decreasing in height and approaching and intersecting such upper edge. Manipulating the strip in this way results in the production of a tip in which the guard stretched on the form, as already described, (measuring from the upper edge of the strip to the base portion or bend in the tip, where it is bent to make the guard,) is of unequal height, gradually diminishing in height from the center of the toe in each direction until the upper edge of the tip and sole are brought together, and portions of this upper edge, near the points *f*, (the guard having been gradually diminished by bending, as described, instead of by cutting, until there is substantially no guard,) when placed between a sole and upper and connected therewith in any usual way, will hold the upper edge of the guard in a smaller curve than the lower portion of the guard, where it bends upward away from the base *h* of the tip. The upper edge of the guard drawn into such position will be caused to incline upward and somewhat backward, as shown in the drawings.

When a portion of the upper edge of the strip beyond the guard is brought substantially between the upper and sole and confined the guard will be held so firmly against the toe of the boot or shoe that in wear such guard cannot turn down away from the toe, as would be the case with a leather tip formed as are the usual copper tips. The upper secured to the inner sole is placed inside the strip thus bent into shape to form a tip, and the notches in the strip permit the adaptation of the tip to shoes of varying sizes.

Having thus described my invention, I claim—

1. A tip for boots and shoes having a folded edge, substantially as described.

2. A tip for boots and shoes having a folded edge at the toe and having a part of its inner edge cut away, whereby it can be bent into shape, substantially as set forth.

3. The leather strip having the notches cut in its inner edge and bent and folded to form the guard and half-sole, substantially as shown and described.

4. As an improved article of manufacture, a shoe-tip composed of a strip of material bent on a curved line to form the guard *g* of the tip, the said curved line at its ends intersecting the upper edge of the strip, thereby causing the guard so formed to incline backward when the strip is bent to bring its inner edges toward each other, as described, the central portion of the guard so formed being highest, and gradually decreasing in height from said central point in each direction to the edge of the strip, whereby the guard is enabled to fit and retain its shape in contact with the toe of the shoe, substantially as described.

5. A shoe-tip composed of a strip of material folded at its edges and bent on a curve, substantially as described, along its under edge for a portion of its length to form a guard of gradually-decreasing height from at or near the center of the guard at the front of the tip toward the ends of the strip, whereby the guard is made to incline inward and the upper edge of the guard is made of less length than the length of the curve between the base of the guard and the flange at the point wherein the curve intersects with or meets the upper edge of the strip, substantially as described.

JOHN A. STOCKWELL.

Witnesses:
E. W. HEATON,
M. J. BROWN.